July 1, 1941.  R. C. NEWHOUSE  2,247,662
RADIANT ENERGY DISTANCE MEASURING SYSTEM
Filed Nov. 16, 1938  3 Sheets-Sheet 3
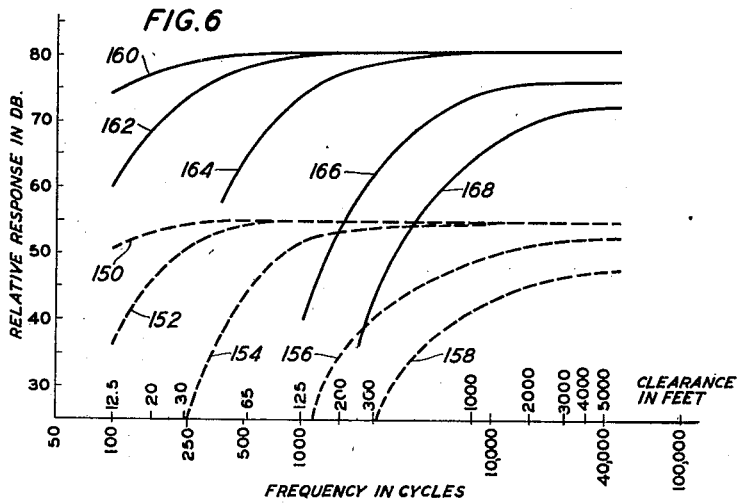
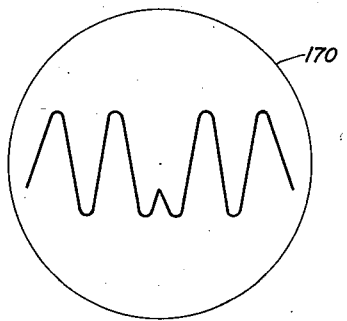
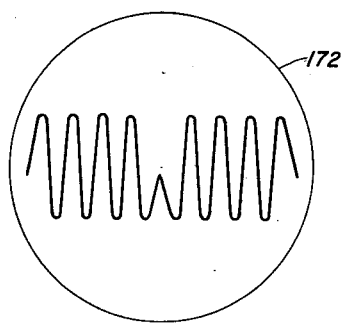
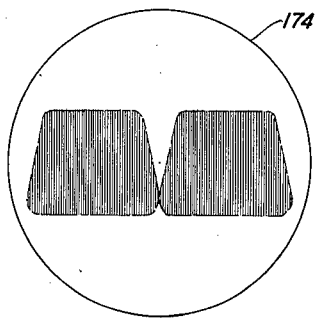
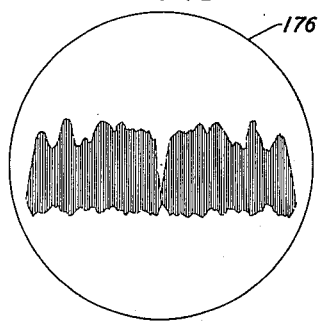
INVENTOR
R. C. NEWHOUSE
BY
E. V. Griggs
ATTORNEY Patented July 1, 1941

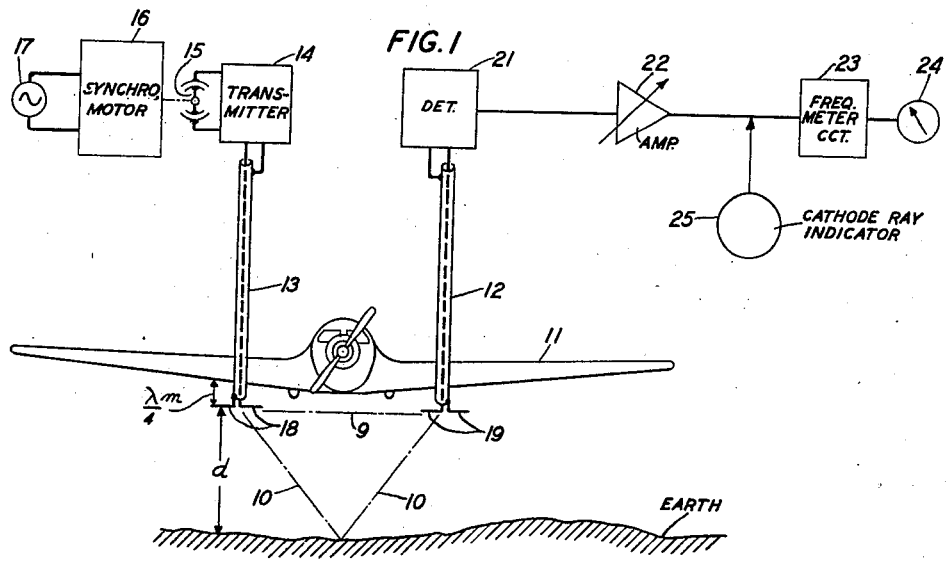
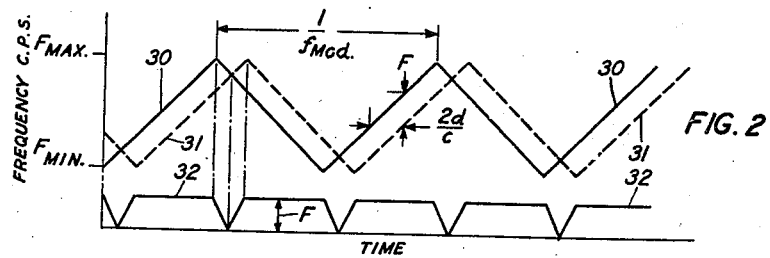
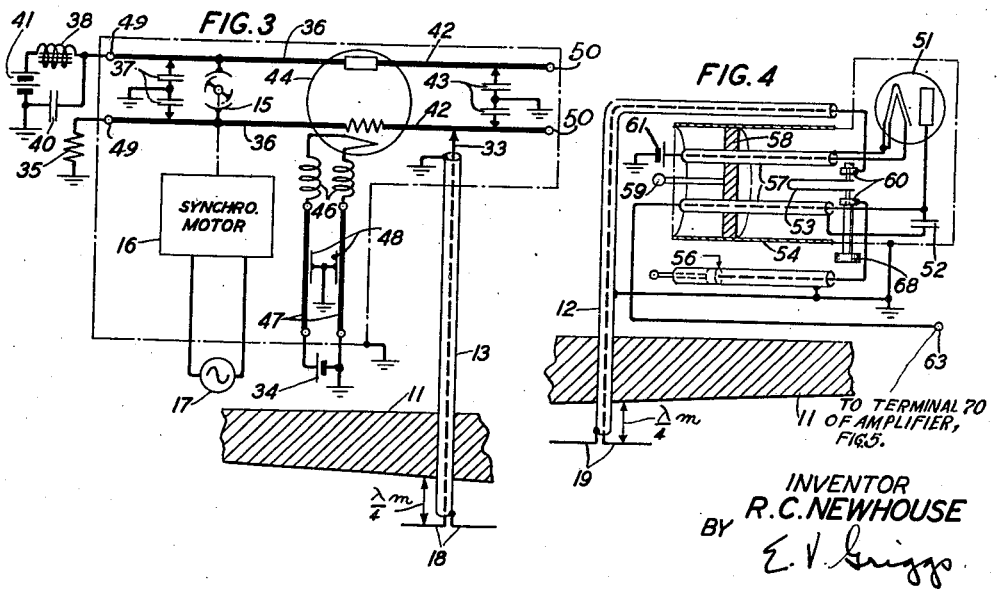

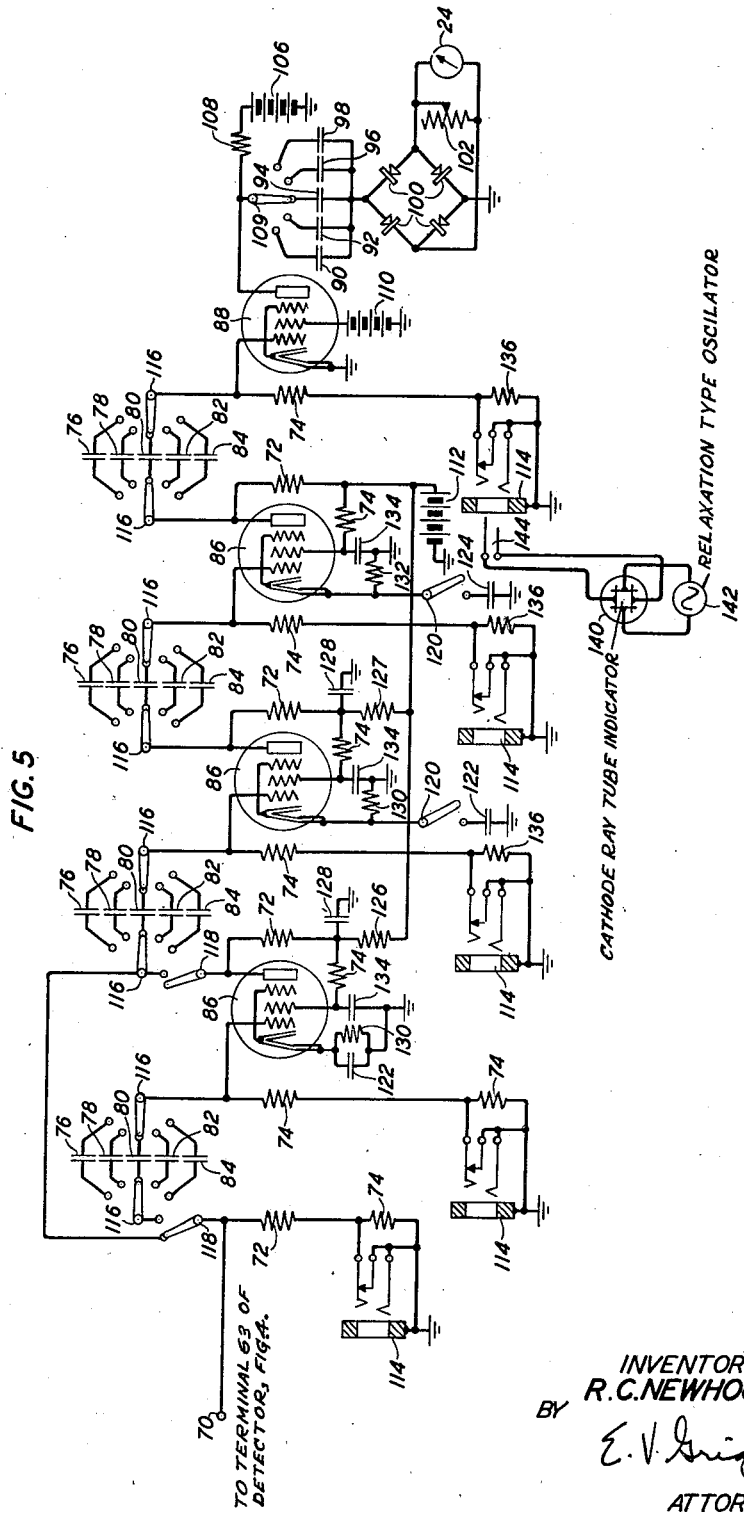

2,247,662

UNITED STATES PATENT OFFICE 2,247,662

RADIANT ENERGY DISTANCE MEASURING SYSTEM

Russell C. Newhouse, Orange, N. J., assignor to Bell Telephone Laboratories, Incorporated, New York, N. Y., a corporation of New York Application November 16, 1938, Serial No. 240,739

19 Claims. (Cl. 250—1)

This invention relates to the art of obtaining intelligence relating to distant surfaces by means of waves and more specifically to improved methods of and means for determining the distance and character of remote surfaces.

The methods and means proposed are hereinafter applied to the specific problems of determining under actual flight conditions, the clearance over and the character of the surface of the earth beneath an aircraft. It will be apparent however that the principles of this invention may be employed in the solution of numerous other problems of the general character indicated above.

It is a specific object of this invention, therefore, to provide improved means for continuously determining and indicating the instantaneous clearance of an aircraft with respect to the surface of the earth above which it is proceeding.

A further specific object is to provide continuous indications on an aircraft of the nature and character of the surface of the earth instantly beneath the aircraft.

Another object is to provide improved methods and means for measuring distances from a rapidly moving object.

Other objects will become apparent during the course of the following description and in the appended claims.

The general method contemplated is that of radiating toward the surface to be investigated a wave of continuously changing frequency, receiving reflections of said wave and beating them with the wave instantly being radiated. The time delay of the reflected waves relative to the instantly radiated wave is, of course, directly proportional to the distance to the reflecting surface. This distance may, therefore, be derived from a comparison of the frequencies of the directly received and the reflected waves. For each discrete clearance a particular, predominant, beat-note frequency will be obtained by demodulation of the combination of reflected and directly received waves. If the reflecting surface is of a relatively uniform character, the demodulation products will consist principally of such a particular simple beat-note frequency. If however the reflecting surface is irregular, a phenomena to be hereinafter referred to as "terrain modulation" of the reflected wave takes place. This type of "modulation" appears to arise from the simultaneous reflection of the wave from numerous and/or rapidly successive surface areas of unequal distances from the aircraft and results in the introduction of frequencies other than that of the predominant beat-note frequency employed for clearance indication.

The frequencies resulting from "terrain modulation" are of a heterogeneous character, varying with the character of the irregularities of the reflecting surface. The approximate frequency range within which the fundamental and stronger harmonics of the "terrain modulation" products are encountered has been found to be dependent upon the clearance and speed of the aircraft relative to the reflecting surface. For example at speeds in the neighborhood of two hundred miles an hour and clearances of two hundred feet or less the fundamental "terrain modulation" products and troublesome harmonics thereof appear to be substantially confined to frequencies below 150 cycles per second for a wide variety of irregular earth surface areas.

As the clearance of the aircraft above the reflecting surface increases, the approximate range within which troublesome "terrain modulation" products are encountered also increases and at a clearance of five thousand feet it is not unusual to encounter such products in the vicinity of one thousand cycles.

In addition, relatively feeble higher harmonics of these terrain modulation products may be found throughout the entire frequency range of demodulation products with which we are concerned in this invention. Observations confirm the theoretical expectation that the fundamental terrain modulation products should be accompanied by a series of harmonics such as are illustrated in Fig. 217 on page 394 of the book "Transmission Networks and Wave Filters" by T. E. Shea published in 1929 by D. Van Nostrand Co. Inc., 250 Fourth Avenue, New York city.

It has been found, however, that if the fundamentals and the stronger harmonics are suppressed the remaining harmonics, unless subsequently unduly amplified, will not mask, override or otherwise interfere with the predominant beat-note in so far as its employment in obtaining clearance indications by the methods of the invention are concerned. It is, however, necessary that the predominant beat-note at any particular clearance should differ appreciably in frequency from the stronger terrain modulation products so that the latter may be excluded by frequency selective circuits which will pass the predominant beat-note. This requirement is met, in the preferred embodiments of the invention described in detail hereinafter, provided that the predominant beat-note for the smallest clearance to be measured has a frequency exceeding 150 cycles per second. The beat-note then is throughout the range of clearances to be measured always of substantially higher frequency than the commonly encountered fundamental terrain modulation products and their stronger harmonics.

The presence in the signal of the terrain modulation products and their harmonics can be detected by frequency analysis, as for example by viewing the wave form of the signal obtained in a cathode ray oscillograph. It has been found that numerous general types of irregular reflecting surfaces may be distinguished by peculiar characteristics of the respective patterns obtained with the system of this invention when reflections from the respective types of surfaces are being received. For example smooth water or a smooth landing field produce a pattern of smooth and regular character. A water surface bearing relatively regular waves produces a pattern having a somewhat similar character, that is a wavy but regular pattern. Wooded areas produce a peculiar spotted pattern, presumably as a result of simultaneous reflection from the tree tops and the ground surface. Rough and irregular surfaces produce a rough and irregular pattern. It is apparent therefore that systems of this invention may prove to be of value in the navigation of aircraft in locating landmarks such as bodies of water, wooded areas, landing fields, etc., under conditions of poor visibility, in addition to furnishing clearance indications thereover.

In the adaptation of the general methods of this invention for use upon aircraft under actual flight conditions a number of other problems are also encountered which must be solved before satisfactory results may be obtained. These problems and the means and methods of solving them will become apparent during the course of the following detailed description of a particular embodiment of the invention illustrated in the following drawings in which:

Fig. 1 shows in diagrammatic form a particular embodiment of this invention;

Fig. 2 is illustrative of the interrelation with respect to frequency and time between the direct and reflected signals and the predominant beat-note frequency derived from their combination;

Fig. 3 shows diagrammatically one arrangement of transmitting apparatus suitable for use in the system of Fig. 1;

Fig. 4 shows diagrammatically one form of receiving apparatus suitable for use in the system of Fig. 1;

Fig. 5 shows diagrammatically one form of low frequency amplifier incorporating particular, adjustable, frequency-selective properties suitable for use in the system of Fig. 1;

Fig. 6 indicates certain of the frequency-selective properties incorporated in the amplifier of Fig. 5; and Figs. 7A, 7B, 7C and 7D show cathode ray oscillograph patterns of signals obtained by the system of Fig. 1 for several clearances and types of terrain.

In detail, Fig. 1 represents diagrammatically a terrain clearance indicating system of this invention. Transmitter 14 provides energy for radiation from antenna 18 toward the earth. Concentric line 13 serves to connect the antenna 18 with transmitter 14. Rotary condenser 15 serves to change the frequency of transmitter 14 and is driven at a particular constant speed of rotation by synchronous motor 16. An oscillator 17 having an appropriate frequency to actuate motor 16 at the desired particular speed of rotation constitutes the power supply for motor 16.

Receiving antenna 19 serves to receive reflected waves 10 and directly transmitted waves 9 from antenna 18. Antennas 18 and 19 are both dipole antennas and are mounted on a common longitudinal axis so that the amount of energy directly transmitted from antenna 18 to antenna 19 will be small and of a comparable order of magnitude with that received after reflection from the earth. In particular installations of this system, a spacing of 15 feet between antennas has proven satisfactory. If the wings of the aircraft 11, under which the antennas are mounted, are of metal it is preferable to space the antennas at approximately one-quarter of a wave-length of the mean transmitted frequency below the wings.

Receiving antenna 19 is connected to detector 21 by coaxial line 12. Detector 21 demodulates the combination of direct and reflected waves 9 and 10 respectively and produces the "beat-note" or frequency representing the predominant frequency difference between them and possibly a number of other frequencies, the character and significance of which will be discussed in detail hereinafter. The beat-note and certain possible miscellaneous frequencies are amplified in amplifier 22, the interstage coupling circuits of which are arranged to provide particular adjustable frequency-selective characteristics to be discussed in detail in connection with Figs. 5 and 6.

Frequency meter circuit 23 integrates the output of amplifier 22 and furnishes milliammeter 24 with a direct current the magnitude of which is substantially proportional to the predominant frequency supplied.

Cathode ray indicator 25 is employed to observe the character of the signal current passing through amplifier 22. This current will, when substantially all irregularities have been eliminated from the apparatus of the system itself, comprise a particular beat-note the frequency of which is proportional to the clearance and, if the reflecting surface is irregular, other frequencies resulting from the above-mentioned phenomena of terrain modulation. The character of the current will, therefore, indicate the character of the terrain over which the aircraft is flying.

In Fig. 2 curve 30 represents the frequency variation with time of the transmitted wave as a linear variation with time between a minimum frequency $F_{min.}$ and a maximum frequency $F_{max.}$ at a rate of $f_{mod.}$ (frequency of modulation in cycles per second). Curve 31 similarly represents the frequency-time variation of the reflected wave. It is delayed in time with respect to curve 30 by the time interval $$\frac{2d}{c}$$

where $d$ is the distance between the aircraft and the reflecting surface and $c$ is the speed of the wave (approximately 186,000 miles per second).

By combining the waves represented by curves 30 and 31, a beat-note frequency having a frequency-time variation represented by curve 32 is obtained which will have a predominating frequency F, representing the frequency difference between the instantly transmitted and reflected waves over the larger portion of each half cycle of frequency modulation. This frequency may be found in terms of the symbols defined above from the equation $$F = 4(F_{max.} - F_{min.}) f_{mod.} \frac{d}{c} \quad (1)$$

To obtain a satisfactory and reliable indication at least one cycle of the beat-note frequency F must occur during each sweep from $F_{max.}$ to $F_{min.}$ or vice versa, i. e., during one-half a modulating cycle or during the time interval defined by $$\frac{1}{2 f_{mod.}}$$

The number of cycles of frequency F for such an interval is $$F_{cyc.} = \frac{1}{2 f_{mod.}} F = 2(F_{max.} - F_{min.}) \frac{d}{c} \quad (2)$$

By equating $F_{cyc.}$ to unity and inserting for $d$ the shortest distance it is desired to measure, the frequency sweep required for the system is determined.

By inserting this frequency sweep in Equation 1 and bearing in mind that F should, for the reasons already given in connection with the discussion of terrain modulation, exceed 150 cycles per second for the shortest distance to be measured, a tentative value for $f_{mod.}$ may be obtained. A further matter to be considered, before $f_{mod.}$ is finally selected, is the value of F for the longest distance it is desired to measure. In order to avoid unduly complicating the amplifier design this maximum value of F for the system should not exceed 40,000 cycles per second.

In the illustrative system of Fig. 1 designed to measure distances between 20 feet and 5,000 feet, a frequency sweep ($F_{max.} - F_{min.}$) of 25 megacycles, and a frequency of modulation ($f_{mod.}$) of 80 cycles per second were selected so that the beat-note frequency had a range of from 160 cycles per second to 40,000 cycles per second over the above range of distances.

In practice it may prove difficult to obtain a precisely linear variation in frequency. Fortunately, this is not essential as the system will operate satisfactorily if the variation is only approximately linear.

At and near the points where curves 30 and 31 cross, that is at and near points at which the frequencies of the two waves coincide, it is apparent from Fig. 2 that irregularities occur in the beat frequency represented by curve 32 resulting from the combination of the waves represented by curves 30 and 31 in that the beat frequency goes to zero and returns to its value F. From Fig. 2 it may be seen that these irregularities will be small if $$\frac{2d}{c}$$

is small compared with $$\frac{1}{2 f_{mod.}}$$

The principles of design outlined above will ordinarily result in a choice of parameters such that $$\frac{2d}{c}$$

will be less than one-half of one per cent of $$\frac{1}{2 f_{mod.}}$$

In order that the frequency variation of 25 megacycles could be obtained as a reasonable percentage change and that adequate and substantially uniform transmission could be maintained over the entire range, a mean transmitting frequency of 450 megacycles was selected. A variation of 12½ megacycles each side of this mean frequency represents slightly more than ±2½ per cent change.

In Fig. 3 a transmitting system which will satisfy the requirements above mentioned is diagrammatically represented. The system employs a triode vacuum tube 44 especially designed for use at wave-lengths in the neighborhood of ½ meter. A particular feature of this tube is the provision of a pair of terminals extending from opposite sides of the tube and connected by short straight leads to the respective ends of the control element and a second pair of similar terminals, likewise connected to the respective ends of the anode. The object of this construction is to permit the vacuum tube to be symmetrically placed, electrically, between two tuned sections of parallel-pair transmission lines, commonly known as Lecher wire systems and indicated in Fig. 3 by parallel pairs of conductors 36 and 42, respectively. Details of an appropriate tube construction and the principles underlying its use between two Lecher wire systems as indicated in Fig. 3 are described by A. L. Samuel in the Proceedings of the Institute of Radio Engineers for October 1937, vol. 25, No. 10, pages 1243 to 1252. Bridging condenser pairs 37 and 43 are employed to tune their respective Lecher wire systems to the desired mean transmitting frequency. Terminals 49 at the left ends of the Lecher wire pair of conductors 36 are employed to facilitate the convenient electrical connection of coil 38, condenser 40 and resistance 35 to the pair of conductors 36, as shown. Terminals 50 at the right ends of the Lecher wire pair of conductors 42 are employed solely for mechanical support and make no electrical connections to other parts of the system. Rotary condenser 15 bridged across one Lecher system serves to vary the transmitted frequency, as required for operation of the system, and is driven uniformly by synchronous motor 16 as described in connection with Fig. 1.

Retardation coil 38 serves to exclude low frequencies which may result from amplitude modulation in the tube circuit from anode potential source 41 and condenser 40 serves to by-pass radio frequencies around coil 38 and potential source 41. To prevent degenerative effects in the operation of the transmitter retardation coils 46 are inserted in the filament circuit of tube 44. In this system the degenerative effects are objectionable because they cannot be made to be constant over the range of frequencies required and a large change in transmitted energy as the frequency is changed through the range of frequencies transmitted would result in amplitude modulation at frequencies which are harmonics of $f_{mod.}$ which would be troublesome on account of interference with wanted frequencies of the system. Leads 47 are shielded by shields 48. Resistor 35 carrying the grid current provides an appropriate grid bias for tube 44.

Antenna lead 33 is connected to the grid wire of the right side Lecher system and may be adjusted along this wire to increase or decrease the effective coupling to and radiation from antenna 18 as desired.

In Fig. 4 details of the detector 21 of Fig. 1 are shown and comprise a tuner and a diode detector. The tuner consists of the following elements; an outer grounded shield 54, a short section of a transmission line consisting of a parallel pair of conductors and commonly known as a Lecher system formed by tubes 57 enclosed in shield 54. This Lecher system may, as is well known to those skilled in the art, be tuned by shorting plug 58, the position of which can be adjusted longitudinally by handle 59, shorting plug 58 may also serve to close shield 54 at the point at which it short-circuits the Lecher system and if shield 54 is grounded, as it is in the case illustrated in Fig. 4, shorting plug 58 also serves to ground the short-circuited end of the Lecher system. The receiving antenna 19 is coupled to the above-described Lecher system by the mutual inductance between the Lecher system and a looped conductor 53 connected in the antenna circuit and pivoted at its right end in journals 60 whereby its proximity to the Lecher system may be adjusted by turning handle 68. The primary antenna circuit including the above-mentioned conductor 53 is tuned in a manner commonly employed by those skilled in the art, namely, by a section of concentric line 56 the effective length of which is also adjustable by means of a short-circuiting plug movable by a handle extending from the left end of the section of line. The diode detector tube 51 has its cathode and anode circuits joined by the above-mentioned Lecher system, the lead to the cathode battery 61 passing through the center of one tube of the Lecher system and the lead from the anode circuit to output terminal 63 passing through the other tube of the Lecher system. The purpose of passing the cathode supply and output leads through the tubular conductors of the Lecher system is solely to reduce parasitic or unwanted couplings between the several circuits involved which might otherwise prove troublesome. Condenser 52 serves to pass radio frequency currents and block the low frequency currents which flow through the lead to output terminal 63. As in Fig. 1, concentric line 12 connects antenna 19 with the detector. In accordance with common practice in the art, no direct current bias is employed in the anode circuit of diode detector tube 51. Output terminal 63 connects directly to the input terminal 70 of amplifier 22 shown in detail in Fig. 5. The detector, of course, supplies to the amplifier the low frequency beat-note representing the frequency difference between the reflected and the instantly transmitted energy of the system.

In Fig. 5, the amplifier 22 of Fig. 1 and the frequency meter circuit 23 of Fig. 1 are shown in detail.

The amplifier consists of three stages employing pentode tubes 86, the first stage may be by-passed by throwing switches 118 to the left as shown in Fig. 5. A selection of any one of five coupling condensers is provided between the detector and the first amplifier stage, between the successive stages of the amplifier and between the last amplifier stage and the pentode 88 of the frequency meter circuit. Switches 116 may be mechanically connected so as to be operable simultaneously to select a given value of coupling capacity for each of the four intertube coupling circuits mentioned above. In addition switches 120 connect shunting condensers 122 and 124 about grid biasing resistors 130 and 132 respectively of the second and third amplifier tubes. Switches 120 may be mechanically operable simultaneously with switches 118, the condensers normally being in the circuit when the first stage is by-passed.

Except for these adjustable features, the amplifier is an ordinary low frequency amplifier of conventional design. The adjustments are added to permit the introduction into the low frequency portion of the system of particular frequency selective properties appropriate for the several ranges of clearance and terrain character frequently encountered in the navigation of aircraft.

In Fig. 6 the frequency selective characteristics for the five positions of switches 116, of Fig. 5 with the first stage by-passed and condensers 122 and 124 in the circuit, are shown by curves 150, 152, 154, 156 and 158 respectively. With the first stage in the circuit and switches 120 opened so that condensers 122 and 124 are out of the circuit the selective characteristics become those of curves 160, 162, 164, 166 and 168 respectively.

It is essential that frequency selectivity be provided to exclude terrain modulation as mentioned above and also unwanted or noise frequencies and their harmonics which are prone to develop in complex vacuum tube circuits, especially under actual flight conditions. Fortunately the most objectionable of these latter frequencies occur in the neighborhood of 100 cycles per second and lower. Since the attenuation of the reflected signal normally increases with the clearance measured, the amplifier gain should increase with frequency. It was found that an increase in the gain of approximately 6 decibels per octave increase in beat-note frequency was satisfactory to compensate for the increasing attenuation with clearance.

A limitation, however, was found necessary in that if harmonics of the wanted signal or stray frequencies higher than the signal were amplified in excess of from 6 to 10 decibels beyond the amplification of the wanted signal such higher frequencies in many instances would tend to override the wanted signal and produce false clearance indications.

Each of the 10 frequency-gain characteristics of Fig. 6 therefore is particularly well adapted for use over a particular range determined by the amount of amplification required for the wanted signal, the degree to which frequencies below the signal frequency need be suppressed and the amount of gain provided for frequencies above the particular signal frequency instantly being employed. These characteristics also serve to illustrate the fact that increasing the range of beat-note frequencies employed in a particular system increases the complexity of the amplifying system required.

The range of 160 to 40,000 cycles per second appears to be an excellent compromise in view of the practical problems involved. This range of beat-note frequencies is adequate to give satisfactory results over the most useful range of clearances but any substantial extension of the beat-note frequency range would render the construction of appropriate amplifying and frequency measuring systems very much more difficult.

The amount of gain required varies, of course, with the character of the surface from which reflections are being received, as well as with the clearance thereover. For example, water is an excellent reflector, ordinary earth is fair and wooded areas may be poor reflectors.

The frequency meter circuit 23 of Fig. 1 is shown in detail in Fig. 5 and comprises pentode 88, coupling resistor 74, screen grid battery 110, a selection of five condensers 90, 92, 94, 96 and 98, any one of which may be chosen by turning switch 109 to the corresponding contact, full wave rectifier 100, meter shunt 102, resistor 108 and anode battery 106.

The operation of the frequency meter circuit is as follows. The cathode-anode impedance of pentode 88, in the absence of a signal above a critical threshold value, is very low and practically the total voltage of anode battery 106 is therefore across resistance 108. When a signal of amplitude sufficient to block the anode circuit is received from the amplifier the cathode-anode impedance immediately becomes very high during a portion of each half cycle of the signal when the input grid is negative. The condenser selected by switch 109 is therefore charged by battery 106 during the negative half cycles and discharged through the low anode-cathode impedance of the tube during the positive half cycles of the signal. The circuit is designed so that the charging time constant of the condenser selected by switch 109 and resistance 108 will be not greater than one-tenth of the time of one cycle of the highest average frequency to be measured. Each charging or discharging current pulse passes a pulse of current through meter 24. These pulses pass through the meter in the same direction by virtue of the use, as illustrated, of the well-known type of full wave rectifying bridge circuit 100.

Since the five condensers 90, 92, 94, 96 and 98 have impedances which decrease inversely with frequency the current in meter 24 will in general increase as the frequency increases. Changing the condenser in effect changes the scale of the meter 24 so that its face may be inscribed with five scales each being best suited for a particular portion of the total range of clearances it is desired to measure. Each scale is, of course, used only when its particular associated condenser has been selected by switch 109. Since the function of the signal from the amplifier is merely to increase the cathode-anode impedance of pentode 88 and the negative half cycles of all signals above a particular threshold value produce this result, it is apparent that the meter indication is substantially dependent upon the frequency and is independent of the amplitude of the signal furnished tube 88 by the amplifier provided the output level of the amplifier is sufficient to block the anode circuit of tube 88 on the negative half cycles.

In Fig. 5 five jacks 114 are provided in different portions of the amplifier circuit into which plug 144 connecting to cathode ray tube 140 may be inserted. Oscillator 142 may be an independent oscillator of the well-known relaxation type whose frequency is synchronized with the frequency of the signal modulating apparatus or it may be dispensed with and energy from the oscillator 17 of Fig. 1 may be employed to control the sweep of the cathode ray. In the latter case if the phase is properly adjusted a pattern equivalent to one-half of those shown in Figs. 7A to 7D, inclusive, will be obtained.

This arrangement permits observations of the signal form as it progresses through the amplifier and is presented to the frequency meter circuit. Typical signal patterns obtained with a relaxation type oscillator are shown in Figs. 7A, 7B, 7C and 7D. At small clearances individual cycles may be distinguished as shown in Figs. 7A and 7B. At greater clearances the higher frequency signal produces a substantially solid pattern. If the character of the reflecting terrain is uniform, a smooth pattern as shown in Fig. 7C is obtained. If the reflecting terrain is irregular the pattern will not be smooth because of terrain modulation of the reflected wave as discussed above. A typical pattern indicative of rough terrain is shown in Fig. 7D. The character of the pattern reflects to an appreciable degree the character of the reflecting terrain.

It is easily possible to distinguish level surfaces such as smooth water or an airport landing field, rough terrain or city areas with buildings of varying heights, and "soft" terrain such as wooded areas. Such information, very apparently, would be invaluable in many instances in permitting aircraft under conditions of limited visibility to locate landmarks such as rivers, woods, cities and landing fields.

The above description is merely illustrative of the application of the principles of this invention. Numerous other applications of these principles within the spirit and scope of the invention may obviously be made by persons skilled in the art. No attempt has here been made to exhaust such possibilities. The scope of the invention is defined in the following claims.

What is claimed is:

1. A terrain clearance indicating system for rapidly moving aircraft comprising means for radiating an electromagnetic wave of varying wavelength from the craft toward the earth, means for directly receiving the instantly transmitted wave on said craft and means for receiving said wave on the craft after it has been reflected from the earth, means responsive to the reflected wave received upon the craft and the instant wave received upon the craft for producing a current having a frequency which is dependent upon the time interval required for said wave to travel to the earth and back, means for amplifying said current, means comprising an electrical equalizing circuit operatively coupled with said amplifying means for causing the over-all frequency-gain characteristic of said equalizing circuit and said amplifying means to compensate for the normal variation of attenuation of said reflected wave with the variation in the distance being measured, and means responsive to said amplified current for indicating the clearance of said aircraft with respect to the surface of the earth beneath it.

2. A terrain clearance indicating system for rapidly moving aircraft as defined in claim 1 and means comprising a second electrical equalizing circuit operatively coupled with said amplifying means for controlling the over-all amplification-frequency characteristic of said second equalizing circuit and said amplifying means at frequencies above that of said travel-time dependent current whereby harmonics and unwanted frequencies present in the system having frequencies greater than that of said travel-time dependent current may be prevented from interfering with the operation of the system.

3. A terrain clearance indicating system for rapidly moving aircraft as defined in claim 1 and adjustable means comprising a second electrical equalizing circuit operatively coupled with said amplifying means for changing the over-all frequency-gain characteristic of said second equalizing circuit and said amplifying means over particular portions of its amplification-frequency characteristic so that the altitude indicating current will override unwanted interfering currents of different frequencies.

4. A terrain clearance indicating system for rapidly moving aircraft as defined in claim 1 and adjustable interstage coupling means in said amplifying means for modifying the effective amplification of currents of frequencies other than that of the said current whose frequency is dependent upon the time interval required for said electromagnetic wave to travel to the earth and back.

5. The method of determining the clearance of a rapidly moving aircraft above the earth which includes radiating an electric wave from the craft toward the earth, continuously varying the frequency of said wave over a certain range, combining the radiated wave and the reflected wave, demodulating the resulting wave and amplifying the predominant demodulation product by an amount determined by the frequency of said product.

6. The method of determining the clearance of a rapidly moving aircraft above the earth including the method defined in claim 5 and the additional step of modifying the effective amplification of frequencies other than that of said predominant demodulation product.

7. The method of determining the clearance of a rapidly moving aircraft above the earth and the character of the terrain over which it is passing which includes radiating an electric wave from the craft toward the earth, continuously varying the frequency of said wave over a certain range, selecting the mean frequency of the said radiated wave to be of such value that the desired range of frequency variation may be obtained with substantially uniform transmitting efficiency, combining the radiated wave and the reflected wave, demodulating the resulting wave and analyzing the demodulation products to obtain indications of altitude and terrain character.

8. In a system for determining the distance of a rapidly moving body from a surface, means for radiating a wave of continuously changing frequency toward said surface and receiving reflections of said wave on said body, means on said body for deriving energy directly from the wave instantly being radiated, means on said body for beating said reflected wave with energy derived from the wave instantly being radiated, and means for conditioning the frequency response of the system to accentuate the predominant beat-note frequency so that it will readily over-ride all other demodulation products and means for determining the frequency of said predominant beat-note whereby misleading indications of the distance to the surface may be avoided.

9. A system for determining on a rapidly moving body the character of a remote surface including the system of claim 8 and means for analyzing the demodulation products resulting from beating the reflected and instantly radiated waves, whereby an indication of the character of the remote surface may be obtained.

10. The combination in a distance determining system for use on rapidly moving craft which includes a first means for securing a current having a frequency proportional to the distance being measured, and a second means for amplifying said current and measuring its frequency, means for regulating the response of the second means at frequencies other than that of said current whereby misleading distance indications may be avoided.

11. The combination in a distance determining system for use on rapidly moving objects which includes a first means for securing a current having a frequency directly proportional to the distance being ascertained, and a second means for amplifying said current and measuring its frequency, regulating means operatively connected to said second stated means for limiting its response to all currents having a lower frequency than said frequency whereby modulation products resulting from the motion of the object may be prevented from producing misleading distance indications.

12. The method of determining the clearance of a rapidly moving aircraft above the earth which includes radiating an electric wave from the craft toward the earth, continuously varying the frequency of said wave over a certain frequency range combining the radiated wave and the reflected wave, demodulating the resulting wave and adjusting the rate of variation of the frequency of said first stated wave to cause the predominant beat-note, the frequency of which is proportional to the clearance to have a substantially higher frequency than the modulation products normally resulting from the rapid motion of the craft with respect to the earth whereby the clearance indicating beat-note may be readily separated from the said modulation products and the likelihood of obtaining misleading clearance indications may be reduced.

13. The method of determining the nature of the terrain over which a rapidly moving aircraft is passing which includes radiating an electric wave from the craft toward the earth, continuously varying the frequency of said wave over a certain frequency range, receiving on said craft reflections of said wave from the terrain beneath, together with directly transmitted energy from said radiated wave demodulating the combination of the radiated wave and the reflected waves, and determining the nature and distribution of the products of demodulation to obtain an indication of the nature of the terrain from which reflections are being received.

14. A terrain character indicating system for rapidly moving aircraft comprising means on said craft for radiating an electromagnetic wave of varying wave-length toward said terrain, means for receiving said wave on the aircraft directly from said radiating means and after reflection from said terrain, means responsive to the said reflections of said wave and the instant wave radiated from the craft for producing current having characteristics dependent upon irregularities of said terrain, and means for observing the characteristics of said current resulting from effects of irregularities of sa'd terrain.

15. The method of determining the clearance of an aircraft above the earth which includes radiating an electric wave from the craft toward the earth, continuously varying the frequency of said wave over a certain range, combining the radiated wave and the reflected wave, demodulating the resulting wave, and adjusting the modulating interval ($F_{max}-F_{min}$) so that at least one full cycle of the beat-note frequency will occur during said modulating interval when the craft is at the minimum clearance to be determined.

16. The method of determining the clearance of a rapidly moving craft from a surface which includes radiating a wave toward the surface, continuously varying the frequency of said wave over a particular range, combining the radiated wave and the reflected wave, demodulating the resulting wave and adjusting the number of modulation cycles per second, $f_{mod.}$, of the transmitted wave to obtain for the smallest clearance to be measured a predominant beat-note frequency exceeding 150 cycles per second.

17. The method of claim 16 with the additional step of adjusting the width of the range of frequency variation to obtain for the largest clearance to be measured a predominant beat-note frequency not exceeding 40,000 cycles per second.

18. Means on a mobile object for determining the character of a remote surface comprising means for radiating an electromagnetic wave of varying wave-length toward said surface, means on said object for receiving energy of said radiated wave directly from said radiating means together with energy of said wave reflected from said surface, means for propelling said object at high speed along a course approximately paralleling the general contour of said surface, means on said object for combining the directly received and the received reflected portions of said wave and detecting the modulation products resulting from said combined portions of said wave, and means for obtaining a representation of the nature and distribution of said modulation products to obtain an indication of the character of the remote surface.

19. The combination defined in claim 18, the means for obtaining a representation of the nature and distribution of the modulation products comprising a cathode ray oscillograph, the lateral deflection of the ray of said oscillograph being synchronized with the variation of the frequency of said radiated wave and voltages generated by the modulation products being impressed upon the vertical deflecting plates of the cathode ray oscillograph tube.

RUSSELL C. NEWHOUSE.